United States Patent
Sayyah

(10) Patent No.: US 8,067,737 B1
(45) Date of Patent: Nov. 29, 2011

(54) PHOTONIC DETECTOR, IMAGING SYSTEM AND METHOD EMPLOYING PLASMONIC RESONANCE ABSORPTION

(75) Inventor: Keyvan Sayyah, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 346 days.

(21) Appl. No.: 12/336,513

(22) Filed: Dec. 16, 2008

(51) Int. Cl.
*G01J 1/00* (2006.01)
*B32B 5/16* (2006.01)

(52) U.S. Cl. .................................... 250/336.1; 428/403

(58) Field of Classification Search .............. 250/336.1; 257/9, 12, 30; 372/43.01
See application file for complete search history.

(56) References Cited

U.S. PATENT DOCUMENTS

| | | | |
|---|---|---|---|
| 6,699,724 B1 | 3/2004 | West et al. | |
| 7,144,627 B2 * | 12/2006 | Halas et al. | 428/403 |
| 7,649,665 B2 * | 1/2010 | Kempa et al. | 359/245 |
| 2003/0174384 A1 * | 9/2003 | Halas et al. | 359/296 |
| 2006/0289761 A1 * | 12/2006 | Nabet et al. | 250/336.1 |

OTHER PUBLICATIONS

A. E. Neeves et al., "Composite structures for the enhancement of nonlinear-optical susceptibility," Opt. Soc. Am. B, vol. 6, No. 4, Apr. 1989, pp. 787-796.

* cited by examiner

*Primary Examiner* — David Porta
*Assistant Examiner* — Faye Boosalis
(74) *Attorney, Agent, or Firm* — North Shore Assoc.

(57) ABSTRACT

A photonic detector, a photonic imaging system and a method of photonic detection employ plasmonic resonant absorption to detect an incident electromagnetic signal. The photonic detector and imaging system include a micro/nanoshell (MNS) structure that supports a surface plasmon and a rectifying junction that rectifies an evanescent electric field of the surface plasmon. The surface plasmon is excited by the incident electromagnetic signal at a plasmonic resonant absorption wavelength of the MNS structure. The method of photonic detection includes providing an MNS structure, exciting a surface plasmon on the MNS structure and rectifying an evanescent electric field of the excited surface plasmon to produce a rectified output signal. The rectified output signal provides detection of the incident electromagnetic signal.

24 Claims, 5 Drawing Sheets

PHOTONIC DETECTOR, IMAGING SYSTEM AND METHOD EMPLOYING PLASMONIC RESONANCE ABSORPTION

CROSS-REFERENCE TO RELATED APPLICATIONS

N/A

STATEMENT REGARDING FEDERALLY SPONSORED RESEARCH OR DEVELOPMENT

N/A

BACKGROUND

1. Technical Field

The invention relates to photonic devices. In particular, the invention relates to photonic detectors that employ surface plasmons.

2. Description of Related Art

Photonic detectors or sensors of various types, employed either singly or in an array, are used in a wide variety of modern optical and infrared (IR) imaging systems. For example, modern digital photography depends almost exclusively on photonic sensor arrays that employ either charge-coupled devices (CCDs) or complementary metal oxide semiconductor (CMOS) active pixel sensors for capturing and creating digital images. Other photonic detection technologies are also often employed, especially in multispectral and hyperspectral imaging systems having operational imaging requirements that may extend well into the long-wave IR (LWIR) spectral range. These other photonic detection technologies include, but are not limited to, photovoltaic devices (e.g., p-i-n photodiodes), devices that utilize photoconduction (e.g., phototransistors), and sensors based on the pyroelectric effect or a temperature-dependent change in resistivity (e.g., bolometers or microbolometers). For example, current state-of-the-art IR focal plane photonic sensor arrays typically employ either mercury cadmium telluride (HgCdTe) IR photodetectors or gallium arsenide (GaAs) quantum well IR photodetectors (QWIPs).

Unfortunately, the existing photonic detectors often fail to meet one or more objectives of many modern imaging systems that cover the visible to LWIR spectrum. For example, semiconductor-based HgCdTe and GaAs QWIP based IR photonic detectors typically must be operated at relatively low temperatures (e.g., below 77° K.) to achieve an acceptable level of performance. As such, IR imaging systems that employ these semiconductor-based IR photonic detectors are not typically able to be used when room-temperature operation is desired unless an associated cost, complexity and power consumption for sensor cooling can be accommodated. In addition, many imaging systems based on semiconductor photodiodes are limited to a finite number of spectral bands due to the material bandgaps used in such devices. On the other hand, imaging systems based on bolometers (e.g., microbolometer arrays) may be operated at room temperature. However, microbolometer arrays generally exhibit spectral sensitivity that is limited to the LWIR spectrum which may preclude their use in some multi-spectral imaging applications. Furthermore, in general the above-discussed photonic detectors typically lack an integrated ability to achieve wavelength tunability. Instead, imaging systems that employ these technologies typically rely on techniques such as beam splitting and filtering in front of the photonic detector array to provide wavelength agility (e.g., dynamic spectral tunability) required for some multispectral and hyperspectral applications.

As such, there is considerable interest in providing a means for photonic detection that will facilitate implementation of high resolution, multispectral imaging systems. In particular, there is need for a photonic detection means that one or more of provides high optical sensitivity at relatively higher temperatures (e.g., room temperature), facilitates implementation of sub-wavelength pixels and provides for both spectral discrimination and dynamic spectral tunability. Providing such means would satisfy a long felt need.

BRIEF SUMMARY

In some embodiments of the present invention, a plasmonic detector is provided. The plasmonic detector comprises a micro/nanoshell (MNS) structure. The MNS structure comprises a shell and a dielectric core surrounded by the shell. The shell supports a surface plasmon on a surface of the shell away from the dielectric core. The plasmonic detector further comprises a rectifying junction adjacent to the surface of the shell. The rectifying junction provides rectification of an evanescent electric field produced by the surface plasmon. The rectification is employed to detect an incident electromagnetic signal at a resonant absorption wavelength of the MNS structure. The incident electromagnetic signal excites the surface plasmon.

In other embodiments of the present invention, a photonic imaging system is provided. The photonic imaging system comprises a plurality of photonic detectors arranged as an array. Each photonic detector of the plurality comprises a micro/nanoshell (MNS) structure and a rectifying junction. The MNS structure comprises a shell and a dielectric core surrounded by the shell. The shell supports a surface plasmon on a surface of the shell away from the dielectric core. The rectifying junction is adjacent to the surface of the shell and provides rectification of an evanescent electric field produced by the surface plasmon. A plasmonic resonant absorption (PRA) wavelength of an MNS structure of a first photonic detector of the plurality differs from a PRA wavelength of an MNS structure of a second photonic detector of the plurality.

In other embodiments of the present invention, a method of photonic detection is provided. The method of photonic detection comprises providing a micro/nanoshell (MNS) structure comprising a dielectric core surrounded by a shell that supports a surface plasmon on a surface of the shell away from the dielectric core. The method of photonic detection further comprises exciting a surface plasmon on the shell surface. The method of photonic detection further comprises rectifying an evanescent electric field of the excited surface plasmon to produce a rectified output signal. The surface plasmon is excited by an incident electromagnetic signal at a plasmonic resonant absorption wavelength of the MNS structure and the rectified output signal provides detection of the incident electromagnetic signal.

Certain embodiments of the present invention have other features that are one of in addition to and in lieu of the features described hereinabove. These and other features of the invention are detailed below with reference to the following drawings.

BRIEF DESCRIPTION OF THE DRAWINGS

The various features of embodiments of the present invention may be more readily understood with reference to the following detailed description taken in conjunction with the accompanying drawings, where like reference numerals designate like structural elements, and in which.

DETAILED DESCRIPTION

Figure 1:
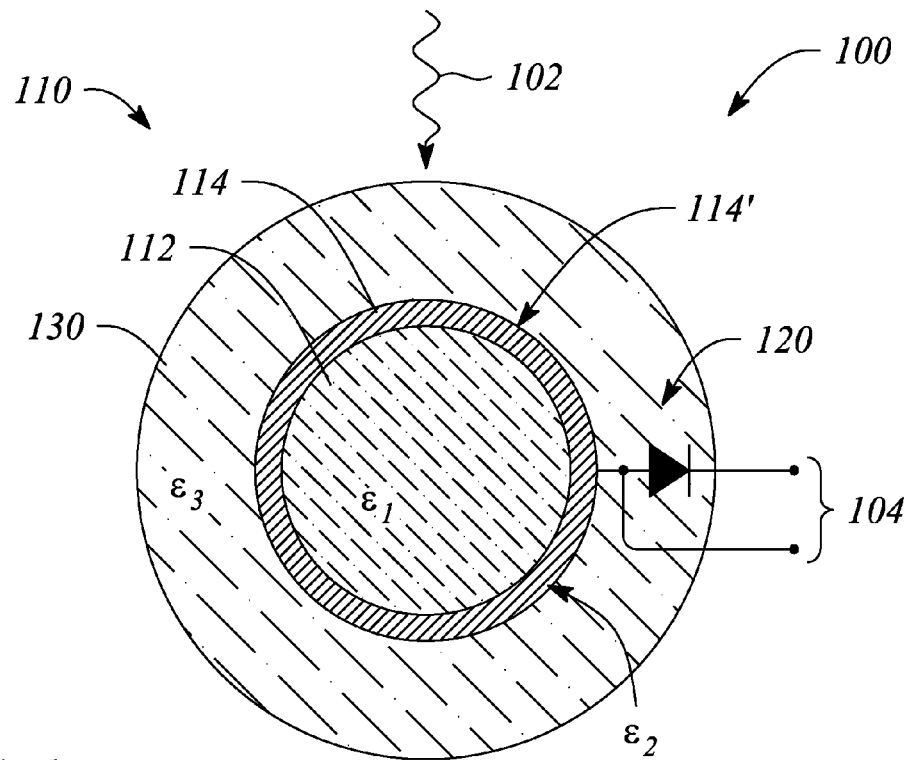
FIG. 1 illustrates a cross sectional view of a plasmonic detector, according to an embodiment of the present invention.

Embodiments of the present invention facilitate detection of optical signals (i.e., photonic detection) using plasmonic resonant absorption. In particular, according to various embodiments of the present invention, plasmonic resonant absorption (PRA) is employed to absorb electromagnetic (EM) radiation of an incident optical signal. The PRA absorbed EM radiation is converted into or excites a surface plasmon. The excited surface plasmon has associated with it a relatively strong evanescent electric field which is rectified to produce a direct current (DC) signal. The DC signal produced by rectifying the evanescent field associated with the surface plasmon is proportional to, and thus effectively provides detection of, the incident optical signal. As such, the present invention provides PRA-based photonic detection. Moreover, the photonic detection of the present invention exhibits high sensitivity as a result of the relatively strong evanescent electric field produced through plasmonic resonant absorption of the incident optical signal, according to some embodiments.

The PRA-based photonic detection of the present invention is both spectrally selective and tunable over a relative broadband, according to various embodiments. In particular, PRA-based photonic detection selectively absorbs spectral portions of the incident optical signal in a relatively narrow band around a predetermined plasmonic resonant wavelength. As such, PRA-based photonic detection provides spectral discrimination or 'wavelength-filtered' detection of the incident optical signal. For example, a plurality of PRA-based photonic detectors having different, selectively tuned plasmonic resonant wavelengths may be employed to implement channelized spectral analysis of the incident optical signal.

In addition, the predetermined plasmonic resonant wavelength associated with PRA-based photonic detection of the present invention may be selectively tuned over a broad range of optical wavelengths, according to some embodiments. For example, through tuning, PRA-based photonic detection may be employed to detect optical signals in a spectral range extending from at least an upper portion of the visible spectrum to frequencies well into the long-wavelength infrared (LWIR) spectrum. Moreover, in some embodiments, PRA-based photonic detection of the present invention may be dynamically tunable (e.g., in situ tuning as a function of time). The dynamic tunability may provide optical signal detection having one or both of wavelength-agility and time-agility in multiple spectral bands, for example.

According to some embodiments, PRA-based photonic detection may be implemented as individual photonic detectors having sub-wavelength dimensions. Such sub-wavelength photonic detectors, when employed in arrays, may provide optical signal detection with sub-wavelength resolution. Furthermore, the photonic detection of the present invention may provide high sensitivity optical signal detection at relatively high temperatures in some embodiments. For example, in some embodiments, photonic detection of optical signals (e.g., LWIR) may be provided at operational temperatures including, but not limited to, room temperature. Moreover, embodiments of the present invention may be implemented as a conformal plasmonic imaging system that can be employed with curved and other essentially non-planar focal plane arrays.

Embodiments of the present invention may employ or be realized on essentially any substrate. In particular, embodiments of the present invention are not limited to fabrication on or in a semiconductor substrate that is lattice matched to a material of the photonic detectors. For example, the photonic detectors may be realized on a glass substrate or plastic substrate. In another example, photonic detectors according to embodiments of the present invention may be fabricated on top of silicon (Si) readout circuitry (e.g., CMOS circuitry) without interfering with the operation or performance of the readout circuitry.

Embodiments of the present invention comprise a micro/nanoshell (MNS) structure. The MNS structure provides plasmonic resonant absorption at a specific plasmonic resonant frequency. In particular, the MNS structure supports a surface plasmon on a surface of the MNS structure. The surface plasmon supported by the MNS structure surface may be excited by an incident optical signal at a plasmonic resonant wavelength of the MNS structure. In general, size, geometry or shape, and optical constants of constituent materials (e.g., index of refraction n) of the MNS structure determine its plasmonic resonant wavelength.

As defined and used herein, the MNS structure comprises a dielectric core surrounded by a shell. In some embodiments, the shell of the MNS structure completely encloses the dielectric core. In other embodiments, the shell may only surround a portion of the dielectric core. The MNS structure is generally less than a wavelength in overall size. In particular, the dielectric core may have an overall size (i.e., a diameter or alternatively, a largest extent) that is less than about a tenth of a free space wavelength $\lambda_0$ of the incident optical signal being detected. The shell of the MNS structure is relatively thin compared to the overall size of the dielectric core. In some embodiments, the shell has a thickness $t_s$ that is more than an order of magnitude smaller than a largest dimension of the dielectric core.

The dielectric core comprises a material that acts as a dielectric with a dielectric constant $\in_1$. Essentially any material that is or acts as a dielectric may be employed as the dielectric core. For example, the dielectric core may comprise a solid or an essentially solid dielectric material. In another example, the dielectric core may comprise a dielectric fluid such as, but not limited to, air or water. In yet another example, the dielectric core may comprise a foam-like or porous structure that includes a combination of solid dielectric material regions and fluid-filled regions. In yet other examples, the dielectric core may be essentially a vacuum or have regions that comprise a vacuum. Even though a vacuum is technically an absence or matter, a vacuum acts as a dielectric in the context of the various embodiments of the present invention. As such, for simplicity of discussion, the definition of a 'dielectric core' explicitly includes cores that comprise a vacuum as well as cores that include an explicit dielectric material. A dielectric constant of the dielectric core along with its size partially determines the plasmonic resonant wavelength of the MNS structure.

The shell of the MNS structure comprises a material that supports a surface plasmon. For example, the shell may comprise a metal such as, but not limited to, gold (Au), silver (Ag), copper (Cu), and aluminum (Al). However, essentially any material that supports a surface plasmon (i.e., has a dielectric constant with a negative real part) may be employed for the shell. In some embodiments, a material having an imaginary part of the dielectric constant that is small (e.g., essentially zero) along with the negative real part of the dielectric constant is preferred to minimize loss. The plasmonic resonant wavelength of the MNS structure is partially determined by the dielectric constant $\in_2$ and thickness of the shell.

For example, the MNS structure may comprise a dielectric core that is spherical and completely enclosed by the thin shell. A diameter $D_c$ of the exemplary spherical dielectric core may be less than about one tenth of a free space wavelength $\lambda_0$ of the incident signal (i.e., $D_c < 0.1\ \lambda_0$), for example. At an LWIR wavelength $\lambda_0$ of about 8-12 micron (μm), for example, the diameter $D_c$ of the exemplary spherical dielectric core may be about 0.8-1.2 μm.

The shell surrounding the exemplary spherical dielectric core may have a thickness $t_s$ that is on the order of about 0.001 $R^c$, to 0.01 $R_c$, where $R_c$ is a radius (i.e., $R^c = {}^{1/2} D_c$) of the core, for example. For example, the shell may comprise a noble metal that is between a few nanometers (nm) and tens of nanometers thick. For example, the shell may be about 2-3 nm thick. In another example, the shell may be about 20-50 nm thick. In yet another example the shell may be approximately 10 nm to 15 nm thick.

Another factor that influences the plasmonic resonant wavelength of the MNS structure is a dielectric constant $\in_3$ of a surrounding material that is adjacent to an outside surface of the shell of the MNS structure upon which the surface plasmon is excited. For example, a plasmon resonant condition for the exemplary spherical MNS structure above with the shell thickness $t_s$ being much, much less than the dielectric core radius $R^c$, (i.e., $t_s \ll R_c$) is given by equation (1) as $$P \cdot \varepsilon_2'(\lambda_p) = -\frac{3}{2}[\varepsilon_1'(\lambda_p) + 2 \cdot \varepsilon_3'(\lambda_p)] \quad (1)$$

where the terms $\in'_j(\cdot)$ where $j \in \{1,2,3\}$, represent a real part of a wavelength-dependent, complex dielectric constant of the dielectric core (i.e., j=1), shell (i.e., j=2), and surrounding material (i.e., j=3), respectively, at the plasmonic resonant wavelength $\lambda_p$. The term P represents a geometry of the exemplary spherical MNS structure in terms of a ratio of the shell volume to the total particle volume. For the exemplary spherical MNS structure, the term P is represented by equation (2) as $$P = 1 - \left(\frac{R_c}{R_T}\right)^3 \quad (2)$$

where $R_c$ is the radius of the dielectric core and $R_T$ represents a total radius of the MNS structure (i.e., of the dielectric core plus the shell).

As is clear from equations (1) and (2), a geometry of the exemplary spherical MNS structure may be readily tailored to achieve a given plasmonic resonant wavelength $\lambda_p$ once particular materials have been selected for the dielectric core, shell and surrounding material, respectively. In particular, due to a very strong dispersion characteristic of the real part of the dielectric constant of metals used for the shell such as, but not limited to, gold (Au) and silver (Ag), a wide range of plasmonic resonant wavelengths may be realized in practice by simply varying a ratio of the dielectric core radius $R^c$ and the shell thickness $t_s$ (or equivalently the total radius $R_T$) of the exemplary spherical MNS structure. For example, a plasmonic resonant wavelength $\lambda_p$ between about 1 μm and 10 μm may be achieved for the exemplary spherical MNS structure having a dielectric core of silicon dioxide ($SiO_2$), a shell of gold (Au) and with the surrounding material being air (i.e., $\in_3 = 1.0$) by using a ratio of the dielectric core radius $R^c$ to shell thickness $t_s$ that ranges from about 10 to less than $10^4$. A similar range of plasmonic resonant wavelengths may be achieved for non-spherical MNS structure, as is readily apparent from the discussion above.

Embodiments of the present invention further comprise a rectifying junction adjacent to the shell of the MNS structure. The rectifying junction may be essentially any non-linear device or element that is coupled to (e.g., intercepts) the evanescent field of the surface plasmon that is excited on the MNS structure by plasmonic resonant absorption. For example, the rectifying junction may be a diode such as, but not limited to, p-n semiconductor diode, a p-i-n semiconductor diode, a metal-semiconductor diode (i.e., a Schottky diode), a metal-insulator-metal (MIM) diode and a metal-insulator-semiconductor (MIS) diode. The diode is located adjacent to an outer surface of the shell of the MNS structure such that the evanescent electric field of the surface plasmon essentially extends across a junction (i.e., rectifying region) of the diode, for example. The evanescent electric field extending across the diode junction induces a current flow through the diode. The current flow is rectified by a non-linear characteristic of the diode junction and results in a DC signal. As noted above, the DC signal is proportional to the incident optical signal in a vicinity of the plasmonic resonant wavelength $\lambda_p$ and therefore represents a detected output signal in various embodiments of the present invention.

For example, a MIM diode may be employed as the rectifying junction. The exemplary MIM diode may have an insulator region with a dielectric constant of about 4 and a thickness of about 50 angstroms, for example. If the MIM diode has an effective area of about 100×100 $nm^2$, the MIM diode will have an estimated diode capacitance of about 1 femto Farad (fF) and an operational cut-off frequency of about 30 Terahertz (THz), assuming a series resistance of about 50 ohms (Ω). A MIM diode with an operational cut-off frequency of 30 Terahertz will support photonic detection of an optical signal in the 10 μm wavelength range. To support photonic detection in the visible spectrum, the effective area of MIM diode may need to be reduced to about 20×20 $nm^2$ depending on the insulator dielectric constant, for example.

The terms 'semiconductor' and 'semiconductor materials' as used herein independently include, but are not limited to, group IV, group III-V and group II-VI semiconductor materials, including compound semiconductor materials, from the Periodic Table of the Elements, or another semiconductor material that forms any crystal orientation. For example, and not by way of limitation, a semiconductor substrate may be a silicon-on-insulator (SOI) wafer with a (111)-oriented or a (110)-oriented silicon layer (i.e., top layer), or a single, free-standing wafer of (111) or (110) silicon, depending on the embodiment. The semiconductor materials that are rendered electrically conductive, according to some embodiments herein, are doped with a dopant material to impart a targeted amount of electrical conductivity (and possibly other characteristics) depending on the application.

An insulator or an insulator material useful for the various embodiments of the invention is any material that is capable of being made insulating including, but not limited to, a semiconductor material from the groups listed above, another semiconductor material, and an inherently insulating material (e.g., a dielectric). Moreover, the insulator material may be an oxide, a carbide, a nitride or an oxynitride of any of the above-referenced semiconductor materials such that insulating properties of the material are facilitated. For example, the insulator may be a silicon oxide ($SiO_x$). Alternatively, the insulator may comprise an oxide, a carbide, a nitride or an oxynitride of a metal (e.g., aluminum oxide) or even a combination of multiple, different materials to form a single insulating material, or the insulator may be formed from multiple layers of insulating materials.

A 'surface plasmon' is defined herein as a surface wave or a plasma oscillation of a surface charge at a surface of a plasmon supporting material adjacent to an insulator (e.g., a dielectric material or a vacuum). The surface charge comprises charges or 'carriers' (e.g., electrons) that are free to oscillate while still being essentially bound to the surface of the plasmon supporting material. For example, the surface plasmon may be the collective oscillations of an electron gas in or at a surface of a metal (i.e., the plasmon supporting material) adjacent to an overlying dielectric material. The metal may be a noble metal, for example. In general, the surface plasmon also may be considered as a quasiparticle representing a quantization of a plasma oscillation in a manner analogous to the representation of an electromagnetic oscillation quantization as a photon. A material is said to 'support' a surface plasmon and hence is a 'plasmon supporting material' if a bound surface charge exists or can exist at the surface of the material and if the bound surface charge provides for the formation the surface plasmon.

In general, the surface plasmon may be excited in the surface of the plasmon supporting material by an incident electromagnetic (EM) field in an optical domain or frequency range. For example, an incident optical signal or beam striking the surface of a metal may excite one or more surface plasmons. An interaction between the surface plasmons and the surface may be characterized in terms of plasmonic modes. In particular, plasmonic modes represent characteristics of surface plasmons in much the same way that electromagnetic oscillations are represented in terms of electromagnetic or optical modes.

Surface plasmons on the plasmon supporting material surface oscillate at the same frequency $\omega(\omega=2\pi f)$ as the frequency of an incident optical field or another excitation source (e.g., an electron beam or another plasmon) used to excite the surface plasmons. However, surface plasmons are not generally constrained by a diffraction limitation in the optical domain. As such, surface plasmons may have a wavelength that is shorter, and in some cases much shorter, than a wavelength of the incident optical field. In particular, surface plasmons are characterized by a wave vector $k_p$, which is related to a wavelength $\lambda_p$ of the surface plasmon by equation (3)

$$k_p = \frac{2\pi}{\lambda_p}. \quad (3)$$

In turn, the surface plasmon wave vector $k_p$ is related to frequency $\omega$ by a dispersion characteristic or relation $\omega$-$k_p$ for the plasmon supporting material. The dispersion relation $\omega$-$k_p$ for the plasmon supporting material along with equation (3) establish how short the surface plasmon wavelength $\lambda_p$ is compared to a free space wavelength $\lambda_0$.

As noted above, surface plasmon supporting materials are materials that have or can support a surface charge that is free to oscillate and support the surface plasmon. Materials that exhibit a dielectric constant having a negative value real part such as, but not limited to, metals and certain organometallics are examples of plasmon supporting materials. Noble metals such as, but not limited to, gold (Au), silver (Ag) and copper (Cu) are materials that are known to support surface plasmons at or near to optical frequencies.

At an interface between a dielectric and a metal, the surface plasmon dispersion relation $\omega$-$k_p$ is given by equation (4)

$$k_{p,metal} = \frac{\omega}{c}\left[\frac{\varepsilon_m(\omega) \cdot \varepsilon_d}{(\varepsilon_m(\omega) + \varepsilon_d)}\right] \quad (4)$$

where c is the speed of light, $\varepsilon_m(\omega)$ is a complex dielectric constant of the metal and $\varepsilon_d$ is a dielectric constant of an insulator (i.e., a dielectric material) at an interface between the metal and the insulator where the surface plasmon is supported.

As used herein, the article 'a' is intended to have its ordinary meaning in the patent arts, namely 'one or more'. For example, 'a layer' generally means 'one or more layers' and as such, 'the layer' means 'the layer(s)' herein. Also, any reference herein to 'top', 'bottom', 'upper', 'lower', 'up', 'down', 'left' or 'right' is not intended to be a limitation herein. Moreover, examples herein are intended to be illustrative only and are presented for discussion purposes and not by way of limitation.

FIG. 1 illustrates a cross sectional view of a photonic detector 100, according to an embodiment of the present invention. The photonic detector 100 receives and absorbs an electromagnetic signal 102 that is incident on the photonic detector 100. The electromagnetic signal 102 is absorbed by plasmonic resonant absorption (PRA). For example, the incident electromagnetic signal 102 may be an optical signal. In some embodiments, the optical signal may have a wavelength associated with a visible spectrum. In some embodiments, the optical signal may have a wavelength from an infrared (IR) spectrum. For example, the optical signal may have a wavelength in the long-wave IR (LWIR) range or band. An output of the photonic detector 100 is provided at terminals 104.

As illustrated, the photonic detector 100 comprises a micro/nanoshell (MNS) structure 110. The MNS structure 110 provides the PRA-based absorption of the incident electromagnetic signal 102. PRA-based absorption excites a surface plasmon on a surface of the MNS structure 110. A size and a shape, as well as constituent materials of the MNS structure 110 establish a plasmonic resonant wavelength of the PRA-based absorption of MNS structure 110.

The MNS structure 110 comprises a dielectric core 112 surrounded by a shell 114. The shell 114 is relatively thin compared to an overall size of the core 112. For example, the shell 114 may be one or more orders of magnitude thinner than a diameter of a spherical dielectric core 112. The shell 114 supports the surface plasmon on a surface 114' (i.e., outer surface) of the shell 114. The surface 114' is a surface of the shell 114 that is away from the dielectric core 112.

The dielectric core 112 comprises a dielectric material having a dielectric constant $\in_1$. The dielectric material of the dielectric core 112 may comprise one or more of a solid material, a fluid, a vacuum, and combinations thereof (e.g., a foam). In some embodiments, the shell 114 comprises a metal and is termed a 'metallic shell' 114. In some embodiments, the metallic shell 114 comprises a noble metal. The shell 114 generally has a complex dielectric constant $\in_2$ with a negative real part (i.e., a real part $\in'_2 < 0$, where $\in_2 = \in'_2 + i \cdot \in''_2$).

For example, the dielectric core 112 may comprise silicon dioxide ($SiO_2$), while the shell 114 may comprise gold (Au). In another example, the shell 114 may comprise aluminum (Al) while the dielectric core comprises aluminum oxide (e.g., alumina —$Al_2O_3$). In yet other embodiments, the shell 114 may comprise one or more of other metals (e.g., titanium, tungsten, chromium) and various conductive organometallics.

The photonic detector 100 further comprises a rectifying junction 120. The rectifying junction 120 is adjacent to the surface 114' of the MNS structure shell 114. The rectifying junction 120 provides rectification of an evanescent electric field produced by the surface plasmon. The rectification essentially produces a direct current (DC) signal from an alternating current (AC) component of the evanescent electric field. Thus, the rectification provides detection of the incident electromagnetic signal. The rectifying junction 120 is illustrated as a diode in FIG. 1. However, essentially any non-linear device may be employed as the rectifying junction 120.

Figure 2A:
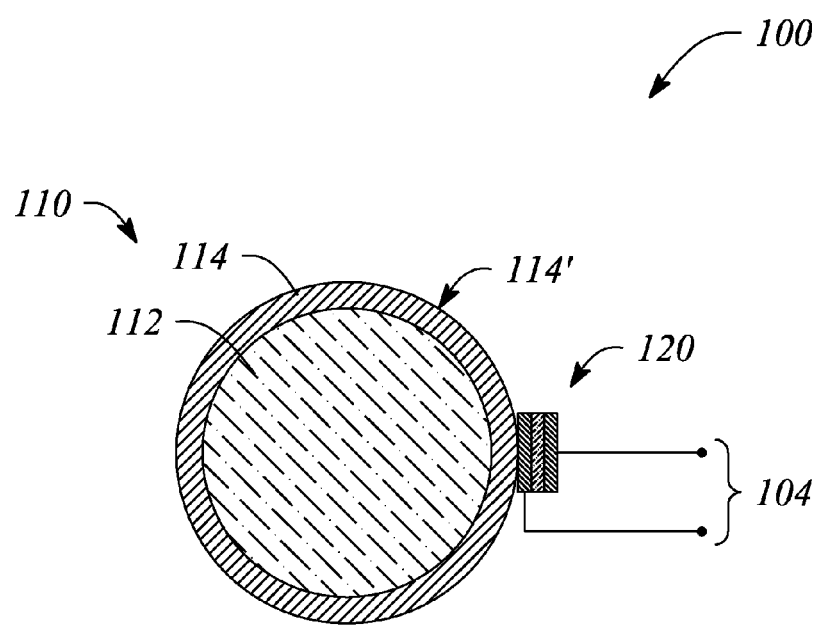
FIG. 2A illustrates a cross sectional view of a photonic detector employing an embodiment of a metal-insulator-metal (MIM) tunneling diode, according to an embodiment of the present invention.
Figure 2B:
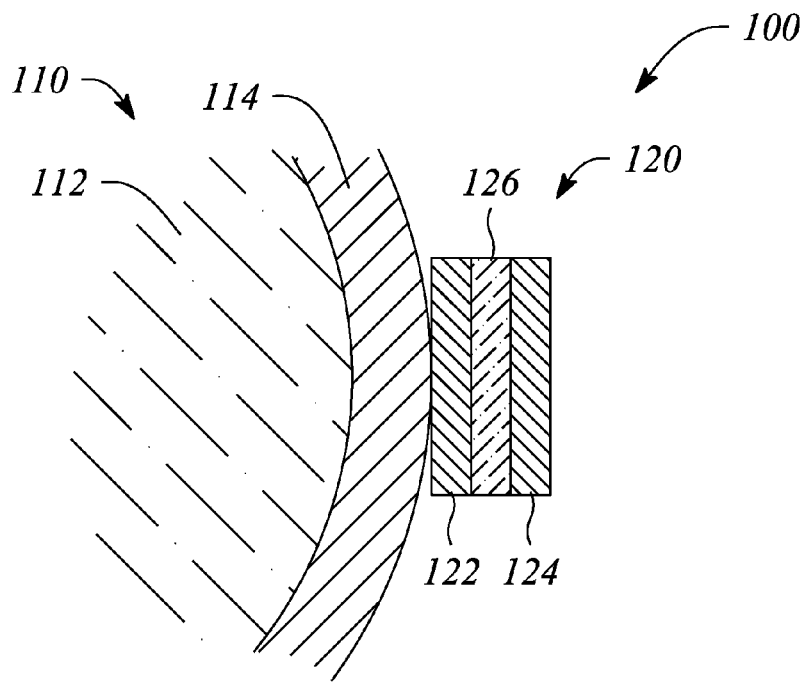
FIG. 2B illustrates an expanded cross sectional view of a portion of the photonic detector illustrated in FIG. 2A in which the MIM tunneling diode embodiment is magnified, according to an embodiment of the present invention.
Figure 2C:
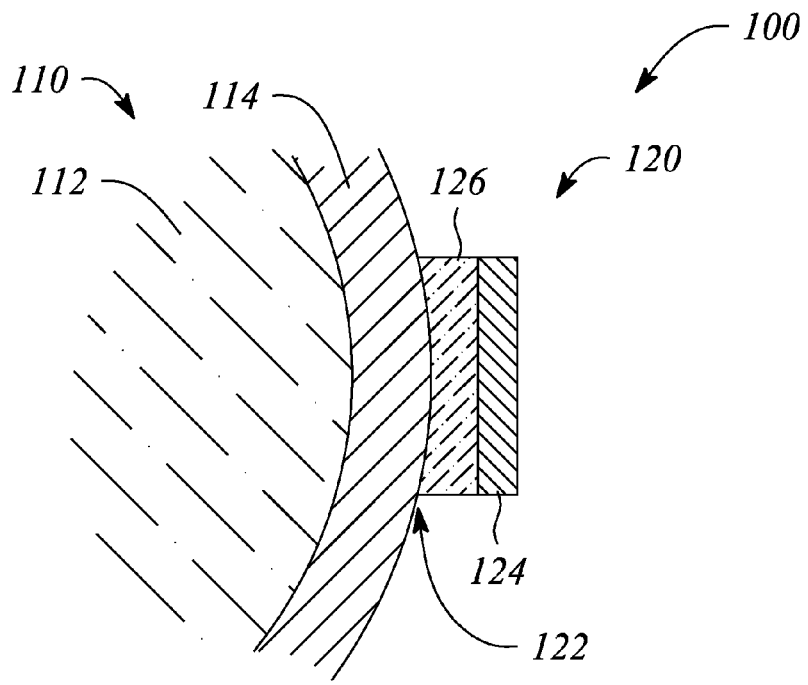
FIG. 2C illustrates an expanded cross sectional view of a portion of a photonic detector employing another embodiment of a tunneling diode.

In some embodiments, the rectifying junction 120 comprises a metal-insulator-metal (MIM) tunneling diode 120. FIG. 2A illustrates a cross sectional view of a photonic detector 100 employing an embodiment of a metal-insulator-metal (MIM) tunneling diode, according to an embodiment of the present invention. FIG. 2B illustrates an expanded cross sectional view of a portion of the photonic detector 100 illustrated in FIG. 2A in which the MIM tunneling diode 120 embodiment is magnified. FIG. 2C illustrates an expanded cross sectional view of a portion of a photonic detector 100 employing another embodiment of a tunneling diode 120.

As illustrated in FIGS. 2A and 2B, the MIM tunneling diode 120 comprises a first metal layer 122 and a second metal layer 124 with a thin, dielectric layer 126 sandwiched between the metal layers 122, 124. In some embodiments, such as is illustrated in FIG. 2C, the first metal layer 122 comprises a portion of the shell 114 of the MNS structure 110. In particular, the MIM tunneling diode 120 embodiment illustrated in FIG. 2C comprises a portion of the shell 114 adjacent to which is a thin dielectric layer 126. Adjacent to the thin dielectric layer 126 and on a side of the thin dielectric layer 126 opposite the shell 114 is the second metal layer 124 of the MIM tunneling diode 120. Using a portion of the shell 114 as the first metal layer of a diode, such as the MIM tunneling diode 120 illustrated in FIG. 2C, may facilitate manufacture of the photonic detector 100, for example.

In other embodiments (not illustrated), the rectifying junction 120 comprises a metal-insulator-semiconductor (MIS) diode. In some of these embodiments, a metal layer of the MIS diode may comprise a portion of the shell 114 of the MNS structure 110. In yet other embodiments (not illustrated), another essentially non-linear device is employed as the rectifying junction 120.

In some embodiments, the photonic detector 100 further comprises a dielectric layer 130 adjacent to the surface 114' of the shell 114, as illustrated in FIG. 1. The dielectric layer 130 has a dielectric constant $\in_3$. The dielectric constant $\in_3$ influences the plasmonic resonant wavelength of the MNS structure 110 and thus facilitates tuning the photonic detector 100. In some embodiments, the dielectric layer 130 comprises air or another fluid associated with an ambient environment in which the photonic detector 100 is operated. In other embodiments (e.g., as illustrated), the dielectric layer 130 comprises a layer of dielectric material that is applied to and covers the MNS structure 110.

In some embodiments, the dielectric layer 130 has a dielectric constant $\in_3$ that is variable in situ. In other words, a value of the dielectric constant $\in_3$ can be changed after manufacture to effectively tune the photonic detector 100. In some of these embodiments, the dielectric constant $\in_3$ is electrically variable.

For example, the dielectric layer 130 may comprise a liquid crystal (LC). Liquid crystals are known to exhibit a strong large voltage-dependent refractive index variation at optical frequencies. According to the so-called Freedericksz effect, the dielectric constant of liquid crystals may be changed by adjusting an orientation of a one-dimensional director of an LC molecule of the LC-based dielectric layer 130 with respect to a polarization of the incident electromagnetic field, for example. Such an orientation adjustment may be achieved by varying a voltage applied across the LC-based dielectric layer 130, for example.

In some embodiments, a tuning range of the photonic detector 100 in excess of 30% may be achieved using the electrically variable dielectric constant $\in_3$ provided by an LC-based dielectric layer 130. Such a tuning range would facilitate tuning an exemplary photonic detector 100 from about a wavelength of 8 μm to a wavelength of about 10 μm, for example.

In some embodiments, the photonic detector 100 further comprises a bias voltage source (not illustrated). The bias voltage source is connected to the rectifying junction 120 to provide a bias voltage across terminals 104 of the rectifying junction 120. For example, the bias voltage may be connected to the metal layers of a MIM tunneling diode employed as the rectifying junction 120. The bias voltage is chosen to bias the MIM tunneling diode at or near an operating point having a highest $2^{nd}$ derivative of a current vs. voltage (i.e., I/V) characteristic of the MIM diode, in some embodiments. Such a bias voltage may maximize a sensitivity of the photonic detector 100 using a MIM diode-based rectifying junction 120, for example.

In other embodiments, a bias voltage source is not employed. For example, the MIM diode-based rectifying junction 120 may be essentially 'self-biased' when using an asymmetrical MIM tunneling diode. An asymmetrical MIM tunneling diode is defined as a metal-insulator-metal tunneling diode structure in which dissimilar metals are used on either side of the insulator.

Figure 3:
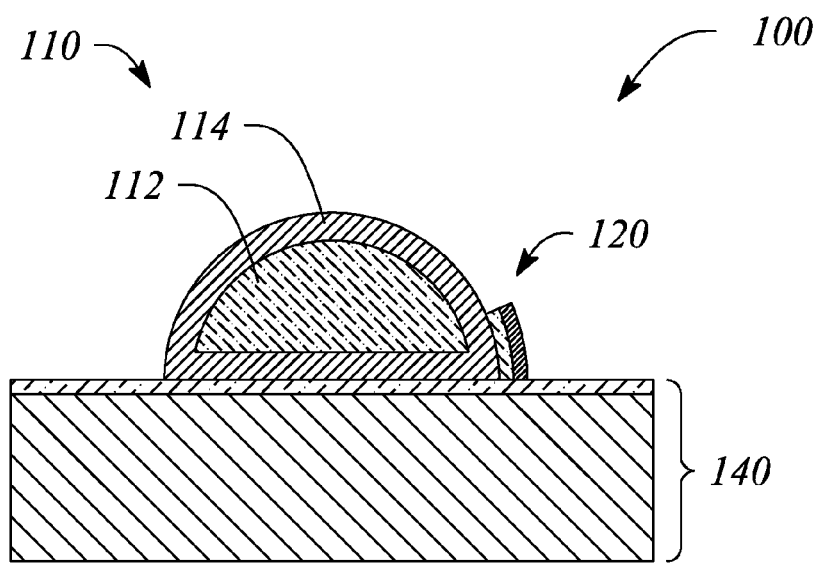
FIG. 3 illustrates a cross sectional view of a photonic detector, according to another embodiment of the present invention.

FIG. 3 illustrates a cross sectional view of a photonic detector 100, according to another embodiment of the present invention. As illustrated in FIG. 3, the photonic detector 100 comprises an MNS structure 110 and an MIM diode-based rectifying junction 120. Further, as illustrated in FIG. 3, the MNS structure 110 is hemispherical in shape. In particular, the MNS structure 110 is illustrated as having a hemispherical shape with a relatively planar side, wherein the shell 114 encloses the dielectric core 112. In some embodiments, the dielectric core 112 has a hemispherical shape that corresponds to the hemispherical shape of the MNS structure 110. The rectifying junction 120 is formed on a side of the hemispherically shaped MNS structure 110 such that a metal layer of the MIM diode comprises a section or portion of the shell 114. Further illustrated is a substrate 140 upon which the photonic detector 100 is formed using conventional circuit fabrication methods (e.g., e-beam lithography). The substrate 140 has a planar surface. The relatively planar side of the hemispherical MNS structure 110 is adjacent to the planar surface of the substrate 140. The substrate 140 may carry circuitry (not illustrated) for interconnecting the photonic detector 100 to an imaging system, for example.

In some embodiments, the substrate 140 may comprise an insulator-on-semiconductor substrate 140. In other embodiments, the substrate 140 comprises a flexible material such as, but not limited to, a plastic sheet (e.g., Mylar), a metal sheet, or another flexible material. For example, for embodiments in which the rectifying junction 120 comprises a MIM diode, the photonic detector 100 may be implemented by depositing and patterning only insulator and metal materials. Such an implementation using a MIM diode may facilitate using essentially any material as the substrate 140.

Figure 4:
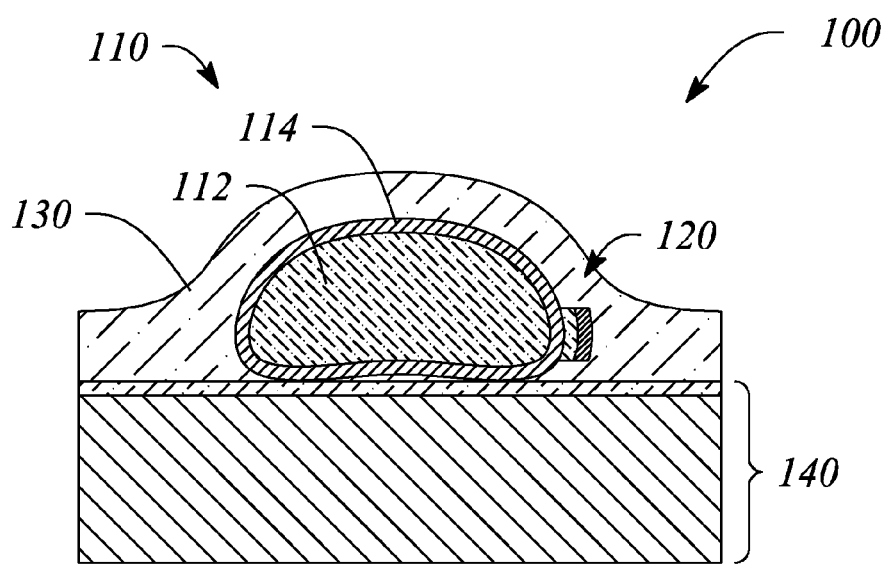
FIG. 4 illustrates a cross sectional view of a photonic detector, according to another embodiment of the present invention.

In other embodiments, the photonic detector 100 may comprise an essentially arbitrarily shaped MNS structure 110 (e.g., but not limited to, oblate spheroid, conical, columnar and disc-shaped). FIG. 4 illustrates a cross sectional view of a photonic detector 100, according to another embodiment of the present invention. As illustrated in FIG. 4, the MNS structure 110 has an essentially random shape provided by the dielectric core 112 and the surrounding shell 114. Also illustrated in FIG. 4 is the dielectric layer 130 depicted as an essentially conformal layer coated on top of the MNS structure 110 and rectifying junction 120 (e.g., MIM diode).

Figure 5:
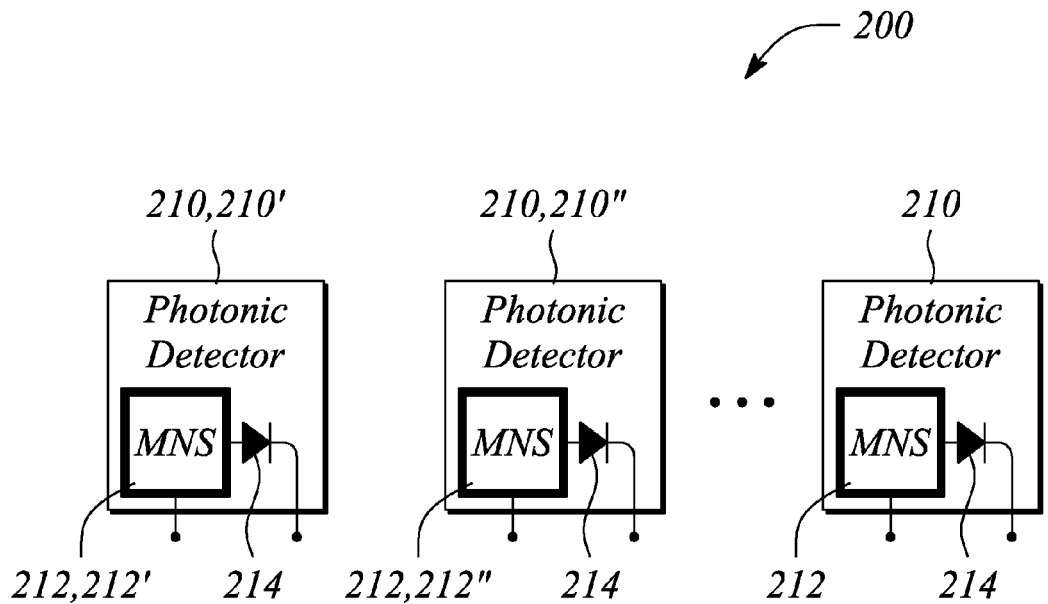
FIG. 5 illustrates a block diagram of a photonic imaging system, according to an embodiment of the present invention.

FIG. 5 illustrates a block diagram of a photonic imaging system 200, according to an embodiment of the present invention. As illustrated, the photonic imaging system 200 comprises a plurality of photonic detectors 210. Each photonic detector 210 of the plurality comprises a micro/nanoshell (MNS) structure 212 comprising a dielectric core surrounded by a shell. The shell surrounding the dielectric core supports a surface plasmon on a surface of the shell away from the dielectric core. Each photonic detector 210 further comprises a rectifying junction 214. The rectifying junction 214 provides rectification of an evanescent electric field produced by the surface plasmon.

In some embodiments, the photonic detectors 210 of the plurality are essentially similar to the photonic detector 100 described above. For example, the rectifying junction 214 may comprise a metal-insulator-metal (MIM) tunneling diode 214, in some embodiments. In some of these embodiments, a first metal layer of the MIM tunneling diode 214 may comprise a portion of the MNS structure shell, for example.

In some embodiments, a plasmonic resonant absorption (PRA) wavelength of an MNS structure 212' of a first photonic detector 210' of the plurality differs from a PRA wavelength of an MNS structure 212" of a second photonic detector 210" of the plurality. As such, the plurality of photonic detectors 210 when operating together may provide simultaneous detection of optical signals across a wide spectral band (albeit at different sub-bands within wide spectral band).

In addition, dimensions of each of the photonic detectors 210 may be sub-wavelength. As such, the plurality of photonic detectors 210 when operated as an array may provide an imaging system having sub-wavelength resolution. Operating together, the array of photonic detectors 210 of the plurality may thus provide imaging of the incident optical signal that is both multispectral and sub-wavelength. For example, several photonic detectors 210, each having a different PRA wavelength, may be grouped together as a pixel of the photonic imaging system. Moreover, a pixel-to-pixel spacing may still be sub-wavelength, in some embodiments.

Figure 6:
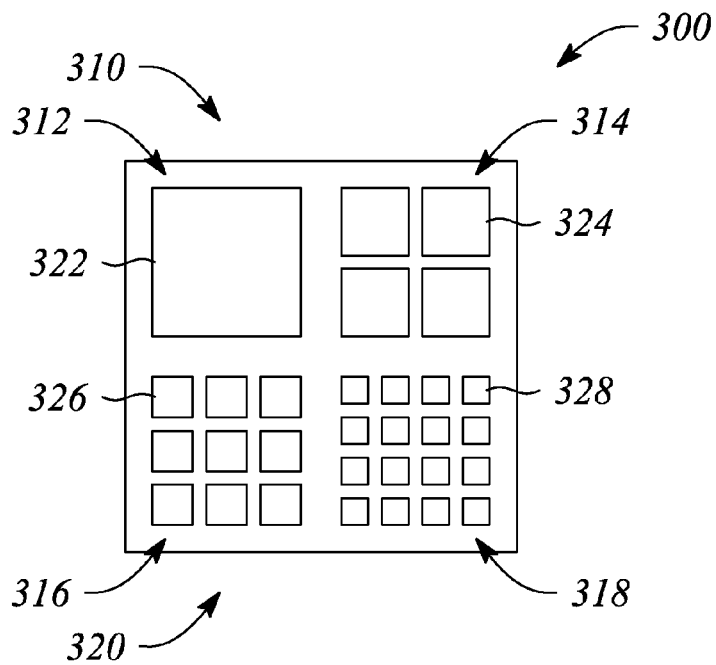
FIG. 6 illustrates a top view an exemplary pixel 300 of an imaging system, according to an embodiment of the present invention.

FIG. 6 illustrates a top view an exemplary pixel 300 of an imaging system, according to an embodiment of the present invention. For example, the exemplary pixel 300 may be one pixel of a plurality of pixels in an array. The array may be conformally formed on a curved surface as a curved focal plane array, for example. As illustrated, the pixel 300 comprises a plurality of sub-pixels 310. Each sub-pixel 310 comprises one or more photonic detectors 320.

For example as illustrated, a first sub-pixel 312 comprises a single photonic detector 322. The single photonic detector 322 of the first sub-pixel 312 comprises an MNS structure having a first PRA wavelength. The single photonic detector 322 may be essentially similar to the first photonic detector 210' described above with reference to FIG. 5, for example.

A second sub-pixel 314 of the plurality of sub-pixels 310 comprises four photonic detectors 324, as illustrated in FIG. 6. The photonic detectors 324 of the second sub-pixel 314 each comprise an MNS structure having a second PRA wavelength that differs from the first PRA wavelength of the photonic detector 322. The photonic detectors 324 of the second sub-pixel 314 may be essentially similar to the second photonic detector 210" illustrated in FIG. 5, for example.

In some embodiments (e.g., as illustrated in FIG. 6), the pixel 300 may further comprise a third sub-pixel 316 and a fourth sub-pixel 318. The third and fourth sub-pixels 316, 318 have respective pluralities of a third photonic detector 326 and a fourth photonic detector 328. The third and fourth photodetectors 326, 328 each comprise MNS structures having PRA wavelengths that differ from one another and from the PRA wavelengths of the first and second photonic detectors 322, 324. Together, the plurality of sub-pixels 310 implements multispectral optical detection within the pixel 300. The multispectral optical detection is provided by the differing PRA wavelengths of the various photonic detectors 322, 324, 326, 328. When the pixel 300 is included in an array of similarly realized pixels, the plurality of pixels may provide multispectral imaging, for example.

In other embodiments (not illustrated), each sub-pixel may have the same number of photonic detectors (e.g., each sub-pixel may have one photonic detector). In some embodiments (not illustrated), the sub-pixels may be co-extensive or overlap one another. For example, photonic detectors of two different sub-pixels may be interspersed with one another within a region of the pixel.

Referring again to FIG. 5, as was discussed above, each photonic detector 210 of the plurality may further comprise a dielectric layer (not illustrated) adjacent to the surface of the MNS structure 212. The dielectric layer may be employed to modify the PRA wavelength of the MNS structure 212 of the photonic detector 210. Modification of the PRA wavelength essentially facilitates tuning a photonic detector 210 of the plurality. In some embodiments, a dielectric constant of the dielectric layer of one or more of the photonic detectors 210 of the plurality is dynamically changeable such that the PRA wavelengths of respective ones of the photonic detectors 210 are independently modifiable. As such, the multispectral imaging of the photonic imaging system 200 may be one or both of time-agile and wavelength-agile.

Figure 7:
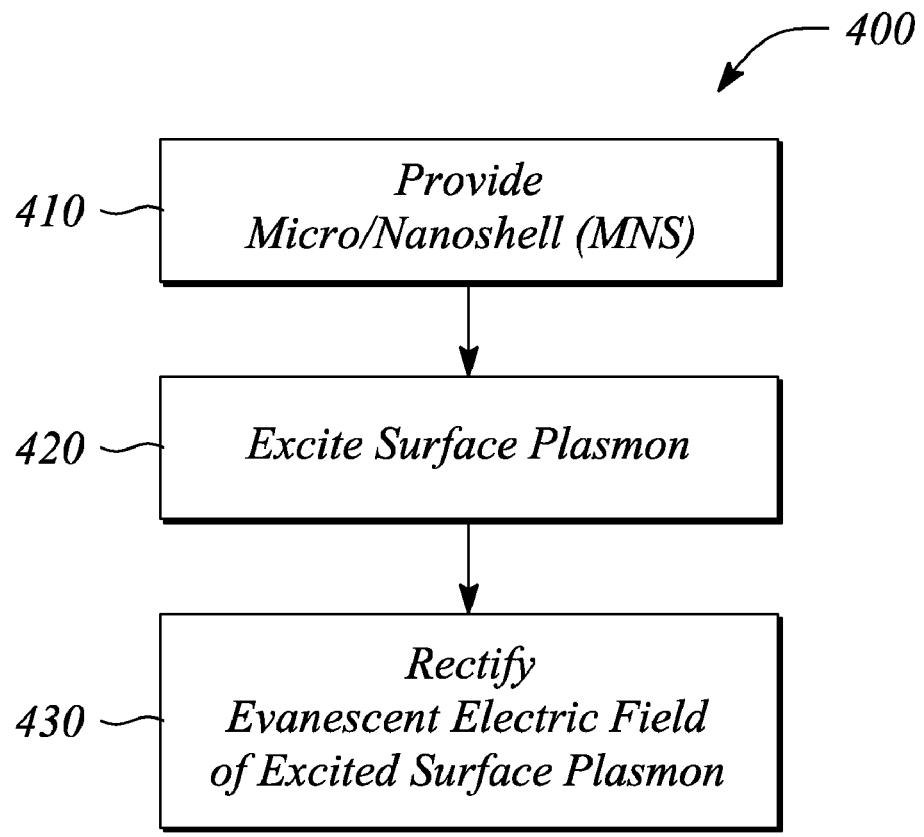
FIG. 7 illustrates a flow chart of a method of photonic detection, according to an embodiment of the present invention.

FIG. 7 illustrates a flow chart of a method 400 of photonic detection, according to an embodiment of the present invention. As illustrated, the method 400 of photonic detection comprises providing 410 a micro/nanoshell (MNS) structure. The provided 410 MNS structure comprises a dielectric core surrounded by a shell that supports a surface plasmon on a surface of the shell away from the dielectric core. The MNS structure may have essentially any shape including, but not limited to, a spherical shape. In some embodiments, the MNS structure is essentially similar to the MNS structure 110 described above with respect to the photonic detector 100.

The method 400 of photonic detection further comprises exciting 420 a surface plasmon on the shell surface of the MNS structure. The surface plasmon is excited 420 by an incident electromagnetic signal at a plasmonic resonant absorption wavelength of the MNS structure. The method 400 of photonic detection further comprises rectifying 430 an evanescent field of the excited surface plasmon to produce a rectified output signal. The rectified output signal provides detection of the incident electromagnetic signal. For example, rectifying 430 may be provided by a rectifying junction adjacent to the MNS structure shell surface. In some embodiments, rectifying 430 is provided by a rectifying junction essentially similar to the rectifying junction 120 describe above with respect to the photonic detector 100.

In some embodiments (not illustrated), the method 400 of photonic detection further comprises providing a metal-insulator-metal (MIM) tunneling diode. The MIM tunneling diode is provided adjacent to the surface of the MNS structure. In such embodiments, rectifying 430 employs the MIM tunneling diode. In some of these embodiments, a first metal layer of the MIM tunneling diode may comprise a portion of the shell of the MNS structure.

In some embodiments (not illustrated), the method 400 of photonic detection further comprises providing a dielectric layer adjacent to the MNS shell surface. A dielectric constant of a material of the dielectric layer modifies the plasmonic resonant absorption wavelength of the MNS structure to tune a detection frequency or equivalently, a detection wavelength, of the photonic detection. In some of these embodiments, the method 400 of photonic detection further comprises dynamically adjusting the dielectric constant of the dielectric layer material. Dynamically adjusting the dielectric constant may be employed to dynamically tune the photonic detection. For example, application of an electric field to a dielectric layer comprising a liquid crystal (LC) may provide dynamic adjustment of a dielectric constant of the (LC) dielectric layer.

Thus, there have been described embodiments of a photonic detector, a photonic imaging system and a method of photonic detection employing plasmonic resonant absorption. It should be understood that the above-described embodiments are merely illustrative of some of the many specific embodiments that represent the principles of the present invention. Clearly, those skilled in the art can readily devise numerous other arrangements without departing from the scope of the present invention as defined by the following claims.

What is claimed is:

1. A photonic detector comprising:
   a micro/nanoshell (MNS) structure, the MNS structure comprising a shell and a dielectric core surrounded by the shell, the shell supporting a surface plasmon on a surface of the shell away from the dielectric core; and
   a rectifying junction adjacent to the surface of the shell of the MNS structure, the rectifying junction providing rectification of an evanescent electric field produced by the surface plasmon.

2. The photonic detector of claim 1, wherein the rectification provided by the rectifying junction is employed to detect an incident electromagnetic signal at a resonant absorption wavelength of the MNS structure, the incident electromagnetic signal exciting the surface plasmon.

3. The photonic detector of claim 1, wherein the shell completely encloses the dielectric core.

4. The photonic detector of claim 1, wherein the shell comprises a noble metal.

5. The photonic detector of claim 1, wherein the rectifying junction comprises a metal-insulator-metal (MIM) tunneling diode.

6. The photonic detector of claim 5, wherein the MIM tunneling diode comprises an asymmetric MIM tunneling diode.

7. The photonic detector of claim 5, wherein a first metal layer of the MIM tunneling diode comprises a portion of the shell.

8. The photonic detector of claim 1, wherein the rectifying junction comprises a metal-insulator-semiconductor (MIS) diode, a metal layer of the MIS diode comprising a portion of the shell.

9. The photonic detector of claim 1, further comprising a dielectric layer adjacent to the surface of the shell, the dielectric layer modifying a resonant absorption wavelength of the MNS structure.

10. The photonic detector of claim 9, wherein the dielectric layer adjacent to the shell surface comprises a dielectric material having a dielectric constant that is controllable to tune the resonant absorption wavelength and dynamically change a detection frequency response of the photonic detector.

11. The photonic detector of claim 10, wherein the dielectric layer comprises a liquid crystal, and wherein a dielectric constant of the liquid crystal is controlled by an electric field applied to the dielectric layer.

12. The photonic detector of claim 1, further comprising a bias voltage source, the bias voltage source being connected to the rectifying junction to provide a bias voltage across the rectifying junction.

13. The photonic detector of claim 1 used in a photonic imaging system, the photonic imaging system comprising:
   a plurality of the photonic detectors arranged as an array, a first photonic detector of the plurality having a different resonant absorption wavelength than a second photonic detector of the plurality.

14. A photonic imaging system comprising:
   a plurality of photonic detectors arranged as an array, each photonic detector of the plurality comprising:
      a micro/nanoshell (MNS) structure, the MNS structure comprising a shell and a dielectric core surrounded by the shell, the shell supporting a surface plasmon on a surface of the shell away from the dielectric core; and
      a rectifying junction adjacent to the surface of the shell, the rectifying junction providing rectification of an evanescent electric field produced by the surface plasmon,
   wherein a plasmonic resonant absorption (PRA) wavelength of an MNS structure of a first photonic detector of the plurality differs from a PRA wavelength of an MNS structure of a second photonic detector of the plurality.

15. The photonic imaging system of claim 14, wherein the rectifying junction of a photonic detector of the plurality comprises a metal-insulator-metal (MIM) tunneling diode, a first metal layer of the MIM tunneling diode comprising a portion of the shell.

16. The photonic imaging system of claim 14, wherein a photonic detector of the plurality further comprises a dielectric layer adjacent to the surface of the shell, the dielectric layer modifying the PRA wavelength of the MNS structure of the photonic detector.

17. The photonic imaging system of claim 16, wherein a dielectric constant of the dielectric layer of one or more of the photonic detectors of the plurality is dynamically changeable such that PRA wavelengths of respective ones of the photonic detectors are independently modifiable.

18. The photonic imaging system of claim 14, wherein the array is divided into pixels, each pixel comprising a plurality of sub-pixels and wherein a first sub-pixel of the sub-pixel plurality comprises the first photonic detector and a second sub-pixel of the sub-pixel plurality comprises the second photonic detector.

19. The photonic imaging system of claim 14, wherein the plurality of photonic detectors arranged in an array are conformally formed on a curved surface as a curved focal plane array.

20. A method of photonic detection employing a surface plasmon, the method comprising:
  providing micro/nanoshell (MNS) structure comprising a dielectric core surrounded by a shell that supports a surface plasmon on a surface of the shell away from the dielectric core;
  exciting a surface plasmon on the shell surface, wherein exciting a surface plasmon comprises using an incident electromagnetic signal at a plasmonic resonant absorption wavelength of the MNS structure; and
  rectifying an evanescent electric field of the excited surface plasmon to produce a rectified output signal, the rectified output signal providing detection of the incident electromagnetic signal.

21. The method of photonic detection of claim 20, further comprising providing a metal-insulator-metal (MIM) tunneling diode adjacent to the surface of the shell, wherein rectifying an evanescent electric field employs the MIM tunneling diode.

22. The method of photonic detection claim 21, wherein a first metal layer of the MIM tunneling diode comprises a portion of the shell of the MNS structure.

23. The method of photonic detection claim 20 further comprising:
  providing a dielectric layer adjacent to the shell surface; and
  tuning a detection frequency of the photonic detector using the dielectric layer,
  wherein a dielectric constant of a material of the dielectric layer modifies the plasmonic resonant absorption wavelength of the MNS structure for tuning.

24. A method of photonic detection claim 20, further comprising dynamically adjusting the dielectric constant of the dielectric layer material.

* * * * *